US012791716B2

(12) United States Patent
Xiao

(10) Patent No.: US 12,791,716 B2
(45) Date of Patent: Nov. 10, 2026

(54) HYBRID LIDAR AND VEHICLE

(71) Applicant: TENSOR AI SINGAPORE PTE. LTD., Singapore (SG)

(72) Inventor: Jianxiong Xiao, Shenzhen (CN)

(73) Assignee: TENSOR AI SINGAPORE PTE. LTD., Singapore (SG)

( * ) Notice: Subject to any disclaimer, the term of this patent is extended or adjusted under 35 U.S.C. 154(b) by 934 days.

(21) Appl. No.: 18/052,583

(22) Filed: Nov. 4, 2022

(65) Prior Publication Data

US 2023/0138784 A1 May 4, 2023

(30) Foreign Application Priority Data

Nov. 4, 2021 (CN) ........................ 202111302540.1

(51) Int. Cl.
*G01S 17/89* (2020.01)
*G01S 7/481* (2006.01)
*G01S 17/931* (2020.01)

(52) U.S. Cl.
CPC ............ *G01S 17/89* (2013.01); *G01S 7/4813* (2013.01); *G01S 7/4815* (2013.01); *G01S 7/4817* (2013.01); *G01S 17/931* (2020.01)

(58) Field of Classification Search
CPC ...... G01S 17/89; G01S 7/4813; G01S 7/4815; G01S 7/4817; G01S 17/931; G01S 17/10; G01S 17/34; G01S 17/58; G01S 17/87; G01S 7/4802; G01S 7/4811
See application file for complete search history.

(56) References Cited

U.S. PATENT DOCUMENTS 9,128,189 B1 * 9/2015 West .......................... G01S 7/03
9,194,946 B1 * 11/2015 Vacanti ................. G01S 13/286
10,036,803 B2 * 7/2018 Pacala ..................... G01S 17/42
10,036,903 B2 * 7/2018 Wang .................... G02F 1/0072
11,079,489 B2 * 8/2021 Surace .................... G01S 13/60
11,210,801 B1 * 12/2021 Zhang .................. G06V 10/811
12,416,717 B2 * 9/2025 Vossiek ................ G01S 13/931
(Continued)

FOREIGN PATENT DOCUMENTS

CN 110837081 A 2/2020
KR 20210036243 A 4/2021
WO WO-2021057809 A1 * 4/2021 .......... G01S 17/931

OTHER PUBLICATIONS

KR20210036243A_English Translation of Description.*
(Continued)

*Primary Examiner* — Assres H Woldemaryam
(74) *Attorney, Agent, or Firm* — Hemisphere Law, PLLC

(57) ABSTRACT

A hybrid lidar is provided, the hybrid lidar includes a laser transceiver. The laser transceiver includes a first laser transceiver and a second laser transceiver, the first laser transceiver transmits first transmitted signals and receives first echo signals reflected back by a target object of the first transmitted signals, the first transmitted signals being frequency modulated continuous waves, the second laser transceiver being configured to transmit second transmitted signals and receive second echo signals reflected back by the target object of the second transmitted signals, the second transmitted signals are pulse waves. Furthermore, a vehicle using the hybrid lidar is also provided.

18 Claims, 4 Drawing Sheets

(56) References Cited

U.S. PATENT DOCUMENTS

| | | | | |
|---|---|---|---|---|
| 2015/0285897 | A1* | 10/2015 | Kilty | G01S 7/285<br>342/201 |
| 2017/0307736 | A1* | 10/2017 | Donovan | G01S 17/931 |
| 2019/0035099 | A1* | 1/2019 | Ebrahimi Afrouzi | G06N 3/008 |
| 2019/0179028 | A1* | 6/2019 | Pacala | H05K 1/181 |
| 2020/0043186 | A1* | 2/2020 | Selviah | G06T 7/33 |
| 2021/0080952 | A1* | 3/2021 | Owechko | G06T 5/73 |
| 2022/0390603 | A1* | 12/2022 | Wang | G01S 17/08 |
| 2023/0011457 | A1* | 1/2023 | Lu | H01S 5/02415 |
| 2023/0039691 | A1* | 2/2023 | Remesch | B60W 30/09 |

OTHER PUBLICATIONS

Radwell et al. (doc. "Hybrid 3D ranging and velocity tracking system combining multi view cameras and simple LiDAR"). (Year: 2019).*

* cited by examiner

HYBRID LIDAR AND VEHICLE

CROSS REFERENCE TO RELATED APPLICATION

This non-provisional patent application claims priority under 35 U.S.C. § 119 from Chinese Patent Application No. 202111302540.1 filed on Nov. 4, 2021, the entire content of which is incorporated herein by reference.

TECHNICAL FIELD

The disclosure relates to the technical field of lidars, in particular to a hybrid lidar and a vehicle.

BACKGROUND

The working principle of lidars is to transmit optical signals to the target object, receive echo signals reflected from the target object, process the transmitted optical signals and echo signals to form point clouds, so as to obtain relevant information of the target object, such as distances, orientations, heights, speeds and even shape parameters. However, different types of lidars form different point clouds and can get different information about the target object. For example, the point cloud formed by TOF (Time of flight) lidar has good quality, low noise, high density and high accuracy in identifying the target object. However, the speed information of the target object cannot be obtained from the point cloud. A frequency modulated continuous wave (FMCW) lidar has a small field of view, so it can not form a full point cloud, but it can get the speed information of the target object from the point cloud.

Therefore, there is room for promotion in lidar technology.

SUMMARY

In a first aspect, a hybrid lidar is provided. the hybrid lidar includes a laser transceiver and a signal processor. The laser transceiver includes a first laser transceiver and a second laser transceiver, the first laser transceiver is configured to transmit first transmitted signals and receive first echo signals reflected back by a target object of the first transmitted signals, the first transmitted signals are frequency modulated continuous waves, the second laser transceiver is configured to transmit second transmitted signals and receive second echo signals reflected back by the target object of the second transmitted signals, the second transmitted signals are pulse wave. The signal processor is configured to generate point cloud data according the first transmitted signals and the first echo signals, and the second transmitted signals and the second echo signals. The point cloud data includes a plurality of point cloud sets, each point cloud sets correspond to one target object, each the point cloud set includes first point cloud sets and second point cloud sets, the first point cloud sets are generated according to the first transmitted signals and the first echo; the first point cloud sets includes speed information; the second point cloud sets are generated according to the second transmitted signals and the second echo signals.

In a second aspect, a vehicle installed with the hybrid lidar is provided. The vehicle further includes a main body, the hybrid lidar is positioned on the main body, As described above, the hybrid lidar and vehicle includes the first laser transceiver transmitting frequency modulated continuous wave and the second laser transceiver transmitting pulse wave. The point cloud data includes a plurality of point cloud sets and each point set includes the first point sets and the second point sets. The first point sets corresponds to the first laser transceiver, and the second point sets corresponds to the second laser transceiver, so that the point cloud data can have the advantages of both the first point sets and the second point sets. That is to say, point cloud data has low noise, good quality and speed information, which is conducive to the recognition of target objects, so as to effectively improve the recognition accuracy of the hybrid lidar, making the hybrid lidar with high practicability and a wide range of application scenarios.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

DETAILED DESCRIPTION OF THE EMBODIMENTS

In order to make the purpose, technical solution and advantages of the disclosure more clearly, the disclosure is further described in detail in combination with the drawings and embodiments. It is understood that the specific embodiments described herein are used only to explain the disclosure and are not configured to define it. On the basis of the embodiments in the disclosure, all other embodiments obtained by ordinary technicians in this field without any creative effort are covered by the protection of the disclosure.

The terms "first", "second", "third", "fourth", if any, in the specification, claims and drawings of this application are configured to distinguish similar objects but need not be configured to describe any particular order or sequence of priorities. It should be understood that the data used here are interchangeable where appropriate, in other words, the embodiments described can be implemented in order other than what is illustrated or described here. In addition, the terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that the references to “first”, “second”, etc. in the disclosure are for descriptive purpose only and neither be construed or implied the relative importance nor indicated as implying the number of technical features. Thus, feature defined as “first” or “second” can explicitly or implicitly include one or more such features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
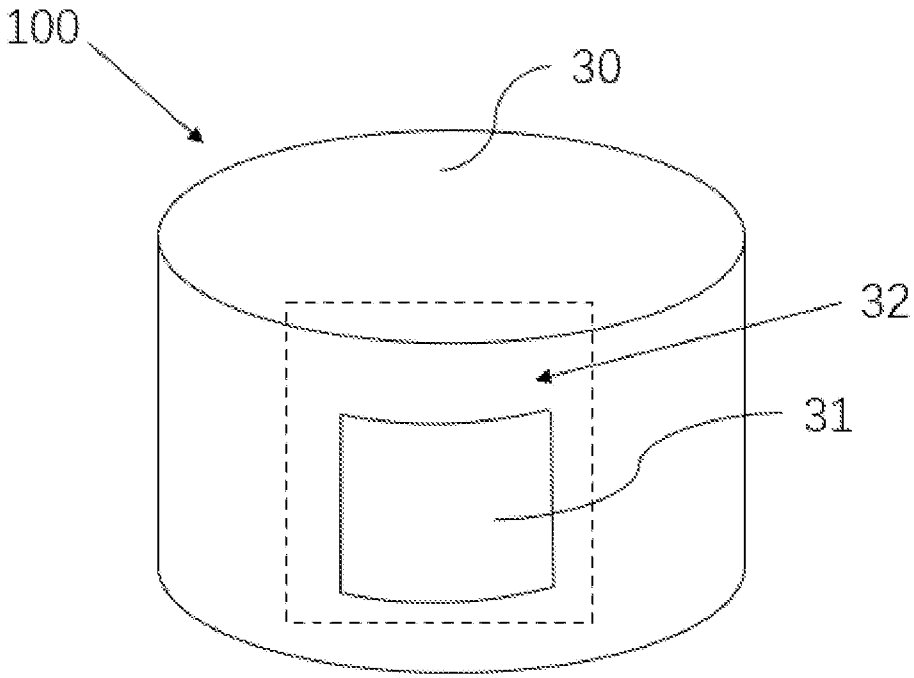
FIG. 1 illustrates a diagram of a hybrid lidar in accordance with a first embodiment.
Figure 3:
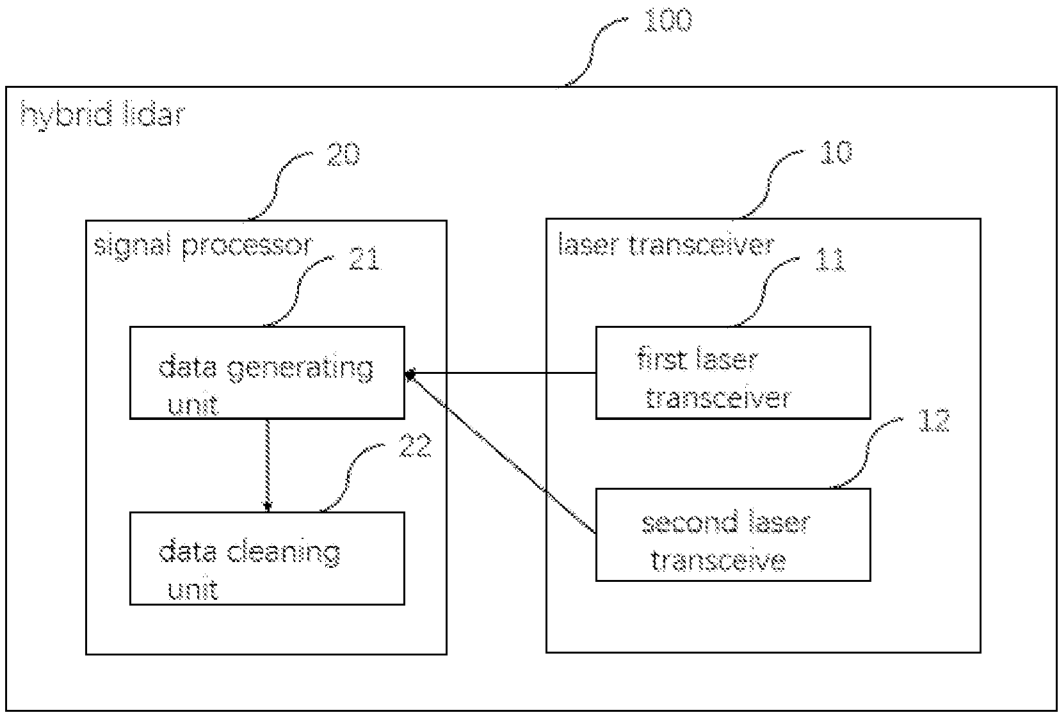
FIG. 3 illustrates a schematic diagram of an internal structure of the hybrid lidar in accordance with a first embodiment.

Referring to FIG. 1 and FIG. 3, a schematic diagram of a hybrid lidar in accordance with a first embodiment is illustrated in FIG. 1, and a schematic diagram of the internal structure of the hybrid lidar in accordance with an embodiment is illustrated in FIG. 3. The hybrid lidar 100 is capable of being installed on the external device to detect surrounding environment of the external device to form point cloud data about the surrounding environment of the external device. The external device can be a vehicle, and a hybrid lidar 100 is configured to detect the surroundings of the vehicle to assist the vehicle in driving. The vehicle includes but are not limited to cars, motorcycles, trucks, sport utility vehicles (SUVs), recreational vehicles (RVs), aircraft, etc. In some embodiments, the external device can also be robots, aircraft and other devices that need to detect the surrounding environment.

The hybrid lidar 100 includes a laser transceiver 10 transmitting and receiving signals, and a signal processor 20 forming point cloud data based on the transmitted and received signals.

The laser transceiver 10 includes a first laser transceiver 11, and a second laser transceiver 12. The first laser transceiver 11 is configured to transmit first transmitted signals and receive first echo signals that are the first transmitted signals reflected back by a target object (not shown). The first transmitted signals are frequency modulated continuous waves. The second laser transceiver 12 is configured to transmit second transmitted signals and receive second echo signals that are the first transmitted signals reflected back from by the target object. The second transmitted signals are pulse wave. In this embodiment, the first laser transceiver 11 is a frequency modulated continuous wave (FMCW) lidar, and the second laser transceiver 12 is the time of flight (TOF) lidar.

Figure 5:
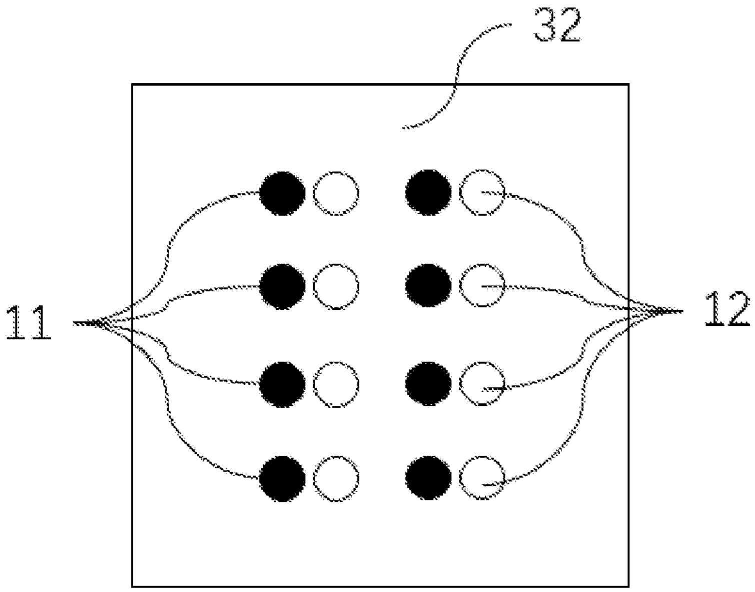
FIG. 5 illustrates a first arrangement of a laser transceiver of the hybrid lidar as shown in FIG. 1.
Figure 6:
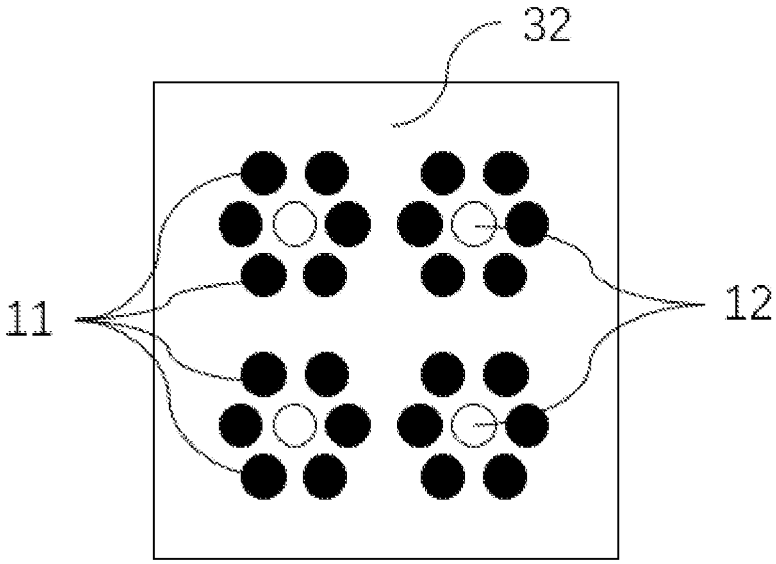
FIG. 6 illustrates a second arrangement of the laser transceiver of the hybrid lidar shown in the FIG. 1.
Figure 7:
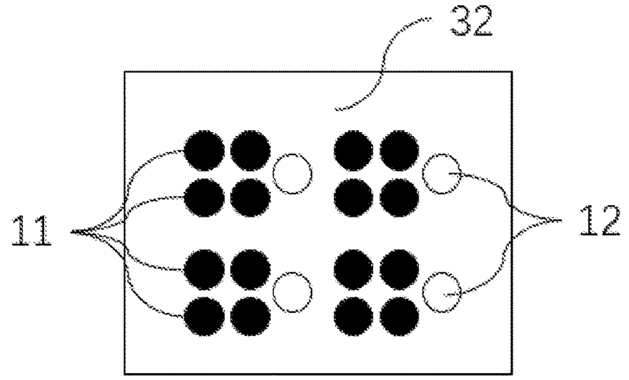
FIG. 7 illustrates a third arrangement of the laser transceiver of the hybrid lidar as shown in FIG. 1.
Figure 8:
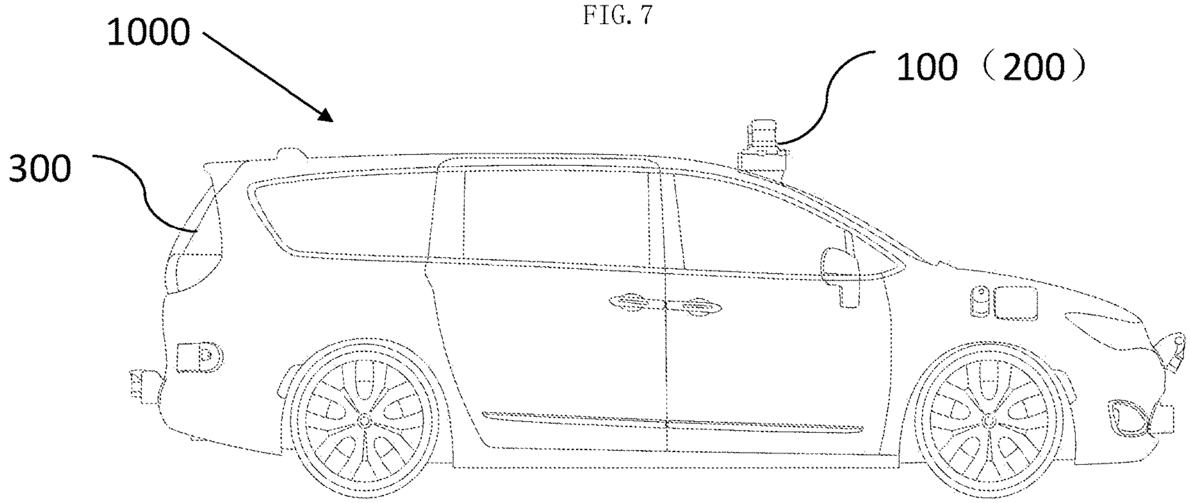
FIG. 8 illustrates a schematic diagram of a vehicle in accordance with an embodiment

The laser transceiver 10 includes N first laser transceivers 11, and M second laser transceivers 12. The N first laser transceivers 11 and the M second laser transceivers 12 are arranged adjacent each other. The N is equal to the M, or the N is not equal to the M, and the N and the M are positive integers. When the N is equal to the M, the first laser transceivers 11 and the second laser transceivers 12 correspond one to one. For an example, one first laser transceiver 11 and one second laser transceiver 12 are arranged adjacent to each other to form a laser transceiver module (as shown in FIG. 5), and the hybrid lidar 100 includes either N or M laser transceiver modules. When N is not equal to M and N is greater than M, the plurality of first laser transceivers 11 correspond to one second laser transceiver 12. For an example, the plurality of first laser transceivers 11 and the one second laser transceiver 12 are adjacent to each other to form a laser transceiver module, and the hybrid lidar 100 includes M laser transceiver modules. The number of the first laser transceiver 11 in each laser transceiver module can be the same or different. the plurality of first laser transceivers 11 can be set around a second laser transceiver 12 (as shown in FIG. 6) and the plurality of first laser transceivers 11 can also be set on the same side of a second laser transceiver 12 (as shown in FIG. 7). When N is not equal to M and N is less than M, a first laser transceiver 11 corresponds to the plurality of second laser transceivers 12. For an example, a first laser transceiver 11 and the plurality of second laser transceivers 12 are set adjacent to each other to form a laser transceiver module, and the hybrid lidar 100 includes N laser transceiver modules. The number of the second laser transceiver 12 in each laser transceiver module can be the same or different. the plurality of second laser transceivers 12 can be set around a first laser transceiver 11, and the plurality of second laser transceivers 12 can also be positioned on the same side of a first laser transceiver 11. In some embodiments, the plurality of first laser transceivers 11 corresponding the plurality of second laser transceivers 12 and may be positioned adjacent to each other to form a single laser transceiver module, and the amount of the plurality of first laser transceivers 11 are different from the amount of the plurality of second laser transceivers 12. In other words, a quantity of the first laser transceivers 11 and a quantity of the second laser transceivers 12 are not limited herein.

The hybrid lidar 100 further includes a rotatable rotating body 30. In some embodiments, the rotating body 30 is in a cylindrical shape, and the rotating body 30 rotates uniformly around a central axis of the rotating body 30. A rotation rate of the rotating body 30 can be determined according to a real demand. For example, when the surrounding environment to be detected is relatively simple and the target objects are few, the rotation rate of the rotating body 30 can be set low to form the point cloud data with sparse point clouds. When the surrounding environment to be detected is complex and there are many target objects, the rotating body 30 can be set with a higher rotation rate to form point cloud data with dense point clouds.

The rotating body 30 has a transferring window 31. In this embodiment, the transferring window 31 is arranged on one side of the rotating body 30. The transferring window 31 is positioned on an outer surface of the rotating body 30. The transferring window 31 can be a cambered surface, and matches the outer surface of the rotating body 30. The transferring window 31 may also be planar and parallel to a section of a side wall of the rotating body 30. When the hybrid lidar 100 is installed on the external device, an orientation of transferring window 31 is the same as a movement direction of the external device in an initial state. When the rotating body 30 is rotated for a circle, that is, 360 degrees, the orientation of transferring window 31 is still the same as the motion direction of the external device.

In this embodiments, there are the plurality of laser transceivers 10. the plurality of laser transceivers 10 are positioned at the rotating body 30 and can rotate 360 degrees with the rotating body 30. the plurality of laser transceivers 10 are arranged on the same side of the rotating body 30 and transmit signals toward the same side. A mounting plate 32 is positioned inside of the rotating body 30 and faced to the transferring window 31. The mounting plate 32 is parallel to the section of transferring window 31, or mounting plate 32 is parallel to transferring window 31. the plurality of laser transceivers 10 are arranged on a side of mounting plate 32 facing transferring window 31. The first laser transceiver 11 and the second laser transceiver 12 form the plurality of laser transceiver modules, and the plurality of laser transceiver modules are arranged on the mounting plate 32 in a straight, a array, or an irregular shape. the plurality of laser transceivers 10 transmit and receive corresponding signals from transferring window 31. The transmitter and receiver of the plurality of laser transceivers 10 are oriented toward transferring window 31. In detail, the first transmitted signals transmitted by the first laser transceiver 11 is transmitted outside the rotating body 30 through transferring window 31, and the first echo signals reflected back from the object is transmitted into the rotating body 30 through transferring window 31 and received by the first laser transceiver 11. The second transmitted signals transmitted by the second laser transceiver 12 is transmitted outside the rotating body 30 through transferring window 31, and the second echo signals transmitted back from the target object is transmitted into the rotating body 30 through transferring window 31 and received by the second laser transceiver 12.

The signal processor 20 is configured to generate point cloud data based on the signals transmitted and received by the first laser transceiver 11 and the second laser transceiver 12. The point cloud data includes the plurality of point cloud sets, and each point cloud sets corresponds to a target object. That is to say, the point cloud data includes the point cloud sets corresponding to the plurality of target objects. In this embodiment, each point cloud sets includes a first point cloud sets and second point cloud sets. The first point cloud is generated based on the first transmitted signals and the first echo signals of the first laser transceiver 11. The second point cloud sets is generated based on the second transmit signal and second echo signals of the second laser transceiver 12. It is understandable that the first point cloud sets and the second point of the same point cloud sets are generated respectively according to the first transmitted signals and the first echo signals, or the second transmitted signals and the second echo signals corresponding to the same target object.

The signal processor 20 includes a data generation unit 21 and a data cleaning unit 22. The data generation unit 21 is configured to generate the first-point and second-point clouds based on the signals transmitted and received by the first laser transceiver 11 and the second laser transceiver 12. In detail, the data generation unit 21 generates the first point cloud according to the first transmitted signals and the first echo signals of the first laser transceiver 11. The data generation unit 21 generates the second point cloud according to the second transmitted signals and the second echo signals of the second laser transceiver 12. the first point cloud sets includes several first subsets, and the second point cloud sets includes several second subsets. The first subset and the second subset correspond one to one. The first and second subsets are generated from the signals transmitted and received by the first and second laser transceivers 11 and 12 of the same laser transceiver module, respectively. One or more attributes of the point cloud of the first point cloud sets are corresponding with one or more attributes of the point cloud of the second point cloud sets one to one. The data cleaning unit 22 is configured to select best point cloud of the same attribute from the first and second point cloud sets according to the same attribute. In detail, the data cleaning unit 22 selects the best cloud according to the same attribute from the first subset and second subset of one-to-one correspondence respectively to form the point cloud sets corresponding to the target object, thus forming the point cloud data. The attributes include but are not limited to three-dimensional coordinates, color, reflection intensity, echo times, etc.

The first point cloud sets of the cloud includes speed information. The data cleaning unit 22 is also configured to select the point cloud including velocity information from the first point cloud to form the point cloud corresponding to the target object, thus forming the point cloud data. It is understandable that the point cloud sets of each target object includes the best point cloud of the same attribute in the first point cloud sets and the second point cloud sets and the point cloud including the velocity information.

The first point cloud sets of the cloud also includes directional information. The data cleaning unit 22 is also configured to select the point cloud including orientation information from the first point cloud to form the point cloud corresponding to the target object, thus forming the point cloud data. Accordingly, the point cloud sets of each object also includes a point cloud with directional information.

When the data cleaning unit 22 selects point clouds from the first and second point clouds respectively to form point clouds, the number of point clouds selected by the data cleaning unit 22 from the first point cloud is smaller than that selected from the second point cloud. That is, in each point cloud sets, the number of point clouds from the first point cloud sets is less than the number from the second point cloud sets.

In this embodiment, when the rotating body is rotated by 30 for a circle, that is, 360 degrees, the data generation unit 21 generates the first point cloud sets and the second point cloud sets respectively according to the first transmitted signals and the first echo signals, the second transmitted signals and the second echo signals obtained by the rotation. The data cleaning unit 22 collect the best point cloud of the point clouds with same attributes, and collect point cloud including speed information and/or direction of point cloud to form a point cloud sets, and the point cloud sets includes the point cloud related to panoramic images of environment about the hybrid laser radar 100.

In the above embodiment, a hybrid lidar is formed by setting the first laser transceiver transmitting frequency modulated continuous wave and the second laser transceiver transmitting pulse wave. The point cloud data includes the plurality of point cloud sets, and each point cloud sets includes the first point cloud sets and the second point cloud sets. the first point cloud sets corresponds to the first laser transceiver, and the second point cloud sets corresponds to the second laser transceiver, so that the point cloud can have the advantages of both the first point cloud sets and the second point cloud sets. Since the first point cloud sets is generated by FMCW and the corresponding first echo signals, and the second point cloud sets is generated by a pulse wave and the corresponding second echo signals, the point cloud in the first point cloud sets includes the velocity information of the target object, and the contour point cloud of the target object in the second point is clear and of good quality. Accordingly, less point clouds of the first point cloud sets can know the moving speed of the target object, and more point clouds of the second point can know the clear contour of the target object. Therefore, the number of point clouds from the first point cloud sets in each point cloud sets is less than the number of point clouds from the second point cloud sets. It is understandable that the final point cloud data has low noise, good quality and speed information, which is conducive to the recognition of target objects, so as to effectively improve the recognition accuracy of hybrid lidar. At the same time, the plurality of laser transceivers are set on a rotatable rotating body, which can drive the laser transceiver to rotate 360 degrees, so as to form a full scenic spot cloud about the surrounding environment of the hybrid lidar, which makes the hybrid lidar have high practicability and a wide range of application scenarios.

Figure 2:
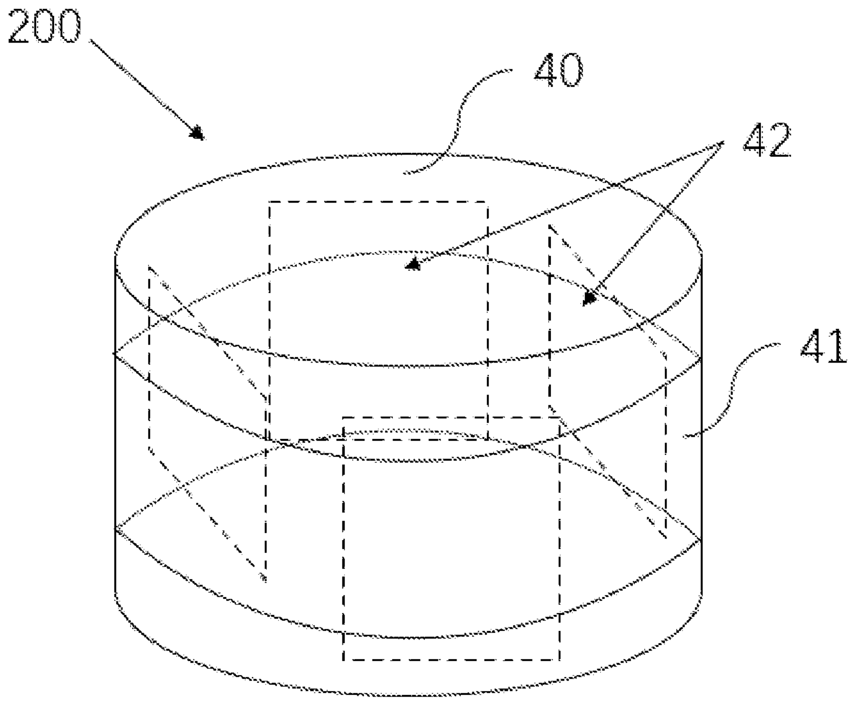
FIG. 2 illustrates a schematic diagram of the hybrid lidar in accordance with a second embodiment of the invention.
Figure 4:
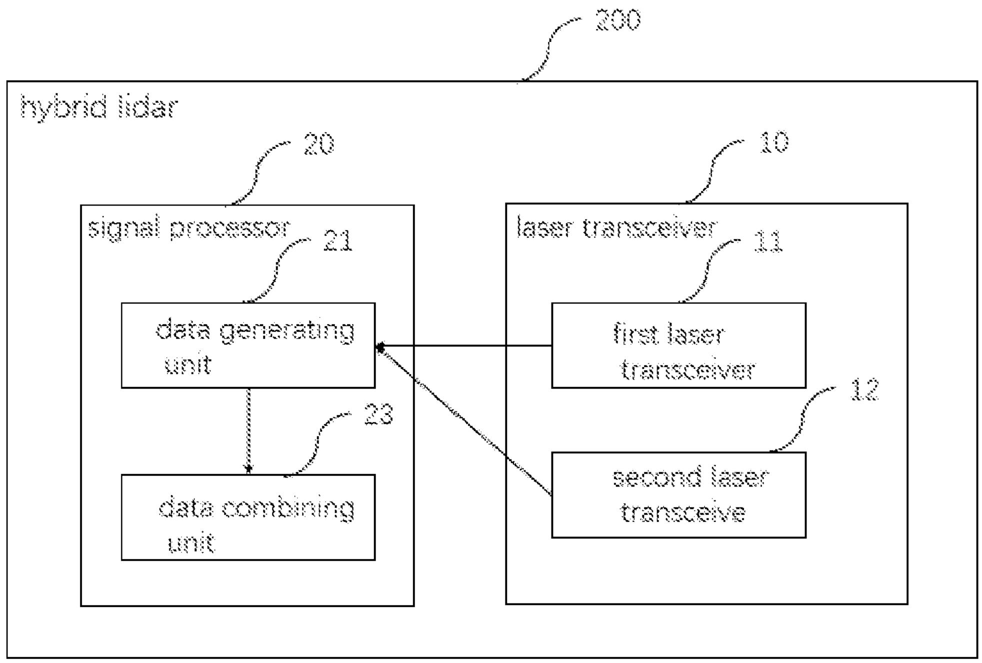
FIG. 4 illustrates a schematic diagram of an internal structure of the hybrid lidar in accordance with a second embodiment of the invention.

Referring to FIG. 2 and FIG. 4, FIG. 2 illustrates a schematic representation of the hybrid lidar in accordance with a second embodiment of the invention, and FIG. 4 illustrates a schematic representation of the internal structure of the hybrid lidar in accordance with a second embodiment. The difference between the hybrid lidar 200 in second embodiment and the hybrid lidar 100 in the first embodiment is that the hybrid lidar 200 in the second embodiment, there are the plurality of laser transceivers 10, and the plurality of laser transceivers 10 cooperate together to form a 360 degree field of view.

The hybrid lidar 200 further includes a housing 40, which is cylindrical in shape. The housing 40 defines a ring scanning window 41, which is arranged on the outer surface of housing 40. the plurality of laser transceivers 10 are arranged on different sides of the housing 40 respectively, and emit signals toward different sides, so that the plurality of laser transceivers 10 cooperates together to form a 360 degree field of view. In this embodiment, a plurality of mounting plates 42 are arranged inside the housing 40, and the plurality of mounting plates 42 are arranged around the central shaft of the housing 40 at intervals. A plurality of laser transceiver modules formed by the first laser transceiver 11 and the second laser transceiver 12 are respectively arranged on the side of a plurality of mounting plates 42 towards the opening scanning window 41. A plurality of laser transceiver modules are arranged on each mounting plate 42 in a linear, array, or irregular shape. The number of laser transceiver modules installed on each mounting plate 42 may be the same or different. The number of the first laser transceiver 11 and the number of the second laser transceiver 12 positioned on each mounting plate 42 may be the same or different.

In some embodiments, the housing 40 includes a ring mounting plate 42 compatible with a ring scanning windows 41, and the plurality of laser transceiver modules formed by the first laser transceiver 11 and the second laser transceiver 12 are arranged on the mounting plate 42 in straight, array, or irregularly spaced shapes.

In some other embodiments, the housing 40 defines a plurality of scanning windows 41 with the plurality of interval, and the number of scanning windows 41 is the same as the number of mounting plate 42 and the mounting plates 42 corresponds to the scanning windows 41 one-to-one.

The signal processor 20 in the hybrid lidar 200 includes a data generation unit 21 and a data combining unit 23. In this embodiment, the data generation unit 21 is configured to generate a point cloud subset based on the signals transmitted and received by the first laser transceiver 11 and the second laser transceiver 12 arranged on the same side. In detail, the data generation unit 21 generates a point cloud subset corresponding to the mounting plate 42 based on the signals transmitted and received by the first laser transceiver 11 and the second laser transceiver 12 of each mounting plate 42. It is understood that the number of copies of the point cloud subset is the same as the number of mounting plates 42, and each point cloud subset includes at least one point cloud sets. The data combining unit 23 is configured to combine the plurality of point cloud subsets to form point cloud data. It is understood that the plurality of the point cloud subsets are the point clouds of the surrounding environment of different sides of the hybrid lidar 200, and the point cloud data formed by combining relates to the panoramic image of the surrounding environment of the hybrid lidar 200. The data generation unit 21 and the data combining unit 23 may be two independent sub-processor cooperate together to form the signal processor 20, and also may be integrated in the signal processor 20.

In some implementation examples, the data generation unit 21 generate the first point cloud subset of data according to the first transmitted signals and the first echo signals of the same laser transceiver module. And the generation unit 21 generate the second point cloud subsets according to the second signals and the second echo signals of the same laser transceiver module. The signal processor 20 also includes a data cleaning unit 22. The data cleaning unit 22 selects best point cloud from the first point cloud subset and the second point cloud subset according to the same attribute to form optimal point cloud subsets corresponding to the laser transceiver module. The optimal point cloud subsets corresponding to at least one laser transceiver module of the same mounting plate 42 forms the point cloud subsets corresponding to the mounting plate 42. The data generation unit 21 and the data cleaning unit 22 may be two independent sub-processors cooperate together to form the signal processor 20, and also may be integrated in the signal processor 20.

Other structures of the hybrid lidar 200 in the second embodiment are basically the same as those of the hybrid lidar 100 in the first embodiment, and will not be described in detail herein.

In the above embodiments, the plurality of laser transceivers are respectively positioned on different sides of the housing, so that the plurality of the laser transceivers together constitute a 360 degree field of view, and the signal processor can generate point cloud forming panoramic images about the surrounding environment of the hybrid lidar according to the signals transmitted and received by the plurality of laser transceivers. The hybrid lidar has high practicability and can be applied to a wide variety of scenarios.

Further referring to FIG. 4, a diagram of the vehicle is illustrated in accordance with an embodiment. The vehicle 1000 includes a main body 300 and a hybrid lidar 100/200 positioned in the main body 300. In this embodiment, the vehicle 1000 includes a hybrid lidar 100/200. In detail, hybrid lidar 100/200 is positioned on top of body 300. The specific structure of hybrid lidar 100 is referred to the first embodiment, and the specific structure of hybrid lidar 200 is referred to the second embodiment. Since Vehicle 1000 adopts all the technical solutions of all the above embodiments, it has at least all the beneficial effects brought by the technical solutions of the above embodiments, and will not be repeated here. When vehicle 1000 includes the hybrid lidar 100, the hybrid lidar 100 can be fixed to body 300 by rotating body 30, or directly formed on body 300 and arranged in one with body 300. When the vehicle 1000 includes the hybrid lidar 200, the hybrid lidar 200 can be fixed to the body 300 through the housing 40, or directly formed in the body 300 that the hybrid lidar 200 and the body 300 are made into one The Vehicle 1000 includes but is not limited to cars, motorcycles, trucks, sport utility vehicles (SUVs), recreational vehicles (RVs), aircrafts, etc. The vehicle 1000 can be either a non-autonomous vehicle or an autonomous vehicle. When the hybrid lidar 100/200 is set in a non-autonomous vehicle, the point cloud data formed by the hybrid lidar 100/200 can be configured to assist human drivers to better understand the environment around the vehicle 1000. When the hybrid lidar 100/200 is installed in the autonomous vehicle, the point cloud data formed by the hybrid lidar 100/200 can be used to help the vehicle 1000 to predict the surrounding objects, make decisions and plan own motion trajectory. The autonomous vehicles have what are called level 4 or level 5 autonomous system. The level 4 autonomous system refers to “high automation”. In principle, a vehicle with level 4 automation system no longer requires the participation of a human driver within its functional scope. Even if the human driver does not respond properly to the intervention request, the vehicle has the ability to automatically reach the minimum risk state. Level 5 automation refers to “full automation”. A vehicle with level 5 automation can drive itself in any legal, drivable road environment. The human driver only needs to set the destination and turn on the system, and the vehicle can take the optimal route to the specified location.

In the above embodiment, because the hybrid lidar can generate point cloud forming panoramic images about the surrounding environment of the hybrid lidar, the vehicle only needs to installed with a hybrid lidar, and it will clearly learn 360 degree environmental information around the vehicle and resulting in significant cost savings. The hybrid lidar is fixed on the top of the vehicle body, the speed information of the objects around the vehicle can be obtained, so as to help the vehicle to predict the motion of the objects, and according to the prediction results, the decision-making and planning of a more suitable trajectory, which makes the vehicle driving more safe and secure.

It should be noted that the embodiments number of this disclosure above is for description only and do not represent the advantages or disadvantages of embodiments. And in this disclosure, the term “including”, “include” or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence “including a . . . ” do not preclude the existence of other similar elements in the process, devices, items, or methods that include the elements.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A hybrid lidar, the hybrid lidar comprises:

a laser transceiver, comprising a first laser transceiver and a second laser transceiver, the first laser transceiver being configured to transmit first transmitted signals and receive first echo signals reflected back by a target object of the first transmitted signals, the first transmitted signals being frequency modulated continuous waves, the second laser transceiver being configured to transmit second transmitted signals and receive second echo signals reflected back by the target object of the second transmitted signals, the second transmitted signals being pulse waves;

a signal processor, being configured to generate point cloud data according the first transmitted signals and the first echo signals, and the second transmitted signals and the second echo signals, the point cloud data comprising plurality of point cloud sets, each point cloud sets corresponding to one target object, each the point cloud set comprising first point cloud sets and second point cloud sets, the first point cloud sets being generated according to the first transmitted signals and the first echo; the first point cloud sets containing speed information; the second point cloud sets being generated according to the second transmitted signals and the second echo signals of the second laser transceiver, wherein point cloud in the first point cloud sets includes velocity information of the target object, and point cloud in the second point cloud sets is contour point cloud of the target object, a quantity of point clouds from the first point cloud sets in each point cloud sets is less than that from the second point cloud sets.

2. The hybrid lidar according to claim 1, wherein the laser transceiver comprising N first laser transceivers and M second laser transceivers, the N is equal to the M, or the N is not equal to the M, and the N and the M are positive integers.

3. The hybrid lidar according to claim 2, wherein the hybrid lidar comprises a plurality of the laser transceivers, the hybrid lidar further comprises a rotatable rotating body, the plurality of the laser transceivers are arranged on the rotating body and can rotate 360 degrees with the rotating body.

4. The hybrid lidar according to claim 3, wherein the plurality of laser transceivers are arranged on the same side of the rotating body and transmit signals toward the same side.

5. The hybrid lidar according to claim 4, wherein the rotating body defines a transferring window, a mounting plate is positioned inside the rotating body and faced to the window, the plurality of the laser transceivers are arranged on a side of the mounting plate facing the window, the plurality of laser transceivers transmit and receive corresponding signals from the transferring window.

6. The hybrid lidar according to claim 2, wherein the hybrid lidar comprises a plurality of the laser transceivers, and the plurality of the laser transceivers cooperate to form a 360 degree field of view.

7. The hybrid lidar according to claim 6, wherein the N first laser transceivers and the M second laser transceivers are arranged adjacent to each other.

8. The hybrid lidar according to claim 6, wherein the hybrid lidar further comprises a housing, and the plurality of laser transceivers are respectively arranged on different sides of the housing and transmitted signals toward different sides; the signal processor comprises a data generation unit and a data combining unit, the data generating unit is configured to generate a plurality of point cloud subsets according corresponding signals transmitted or received by the first laser transceivers and second laser transceivers arranged on the same side, the data combining unit is configured to combine the plurality of point cloud subsets together to form the point cloud data.

9. The hybrid lidar according to claim 6, wherein the signal processor comprises a data generating unit and a data cleaning unit, and the data generating unit is configured to generate the first point cloud sets and the second point cloud sets according to the signals transmitted and received by the first laser transceiver and the second laser transceiver; one or more attributes of point cloud of the first point cloud sets are corresponding to one or more attributes of the point cloud of the second point cloud sets one-to-one; the data cleaning unit is configured to select best point cloud of the same attribute from the first point cloud sets and the second point cloud sets.

10. A vehicle, comprising a main body; and a hybrid lidar, positioned on the main body, the hybrid lidar comprising:

a laser transceiver, comprising a first laser transceiver and a second laser transceiver, the first laser transceiver being configured to transmit first transmitted signals and receive first echo signals reflected back by a target object of the first transmitted signals, the first transmitted signals being frequency modulated continuous waves, the second laser transceiver being configured to transmit second transmitted signals and receive second echo signals reflected back by the target object of the second transmitted signals, the second transmitted signals being pulse waves;

a signal processor, being configured to generate point cloud data according the first transmitted signals and the first echo signals, and the second transmitted signals and the second echo signals, the point cloud data comprising plurality of point cloud sets, each point cloud sets corresponding to one target object, each the point cloud set comprising first point cloud sets and second point cloud sets, the first point cloud sets being generated according to the first transmitted signals and the first echo; the first point cloud sets containing speed information; the second point cloud sets being generated according to the second transmitted signals and the second echo signals, wherein point cloud in the first point cloud sets includes velocity information of the target object, and point cloud in the second point cloud sets is contour point cloud of the target object, a quantity of point clouds from the first point cloud sets in each point cloud sets is less than that from the second point cloud sets.

11. The vehicle according to claim 10, wherein the laser transceiver comprising N first laser transceivers and M second laser transceivers, the N is equal to the M, or the N is not equal to the M, and the N and the M are positive integers.

12. The vehicle according to claim 11, wherein the hybrid lidar comprises a plurality of the laser transceivers, the hybrid lidar further comprises a rotatable rotating body, the plurality of the laser transceivers are arranged on the rotating body and can rotate 360 degrees with the rotating body.

13. The vehicle according to claim 12, wherein the plurality of laser transceivers are arranged on the same side of the rotating body and transmit signals toward the same side.

14. The vehicle according to claim 13, wherein the rotating body defines a transferring window, a mounting plate is positioned inside the rotating body and faced to the window, the plurality of the laser transceivers are arranged on a side of the mounting plate facing the window, the plurality of laser transceivers transmit and receive corresponding signals from the window.

15. The vehicle according to claim 11, wherein the hybrid lidar comprises a plurality of the laser transceivers, and the plurality of the laser transceivers cooperate to form a 360 degree field of view.

16. The vehicle according to claim 15, wherein the N first laser transceivers and the M second laser transceivers are arranged adjacent to each other.

17. The vehicle according to claim 15, wherein the hybrid lidar further comprises a housing, and the plurality of laser transceivers are respectively arranged on different sides of the housing and transmitted signals toward different sides; the signal processor comprises a data generation unit and a data combining unit, the data generating unit is configured to generate a plurality of point cloud subsets according corresponding signals transmitted to or received from the first laser transceivers and second laser transceivers arranged on the same side, the data combining unit is configured to combine the plurality of point cloud subsets together to form the point cloud data.

18. The vehicle according to claim 15, wherein the signal processor comprises a data generating unit and a data cleaning unit, and the data generating unit is configured to generate first point cloud sets and second point cloud sets according to the signals transmitted and received by the first laser transceiver and the second laser transceiver; one or more attributes of point cloud of the first point cloud sets are corresponding to one or more attributes of the point cloud of the second point cloud sets one-to-one; the data cleaning unit is configured to select best point cloud of the same attribute from the first point cloud sets and the second point cloud sets.

* * * * *